(12) United States Patent
Kim et al.

(10) Patent No.: US 6,868,730 B2
(45) Date of Patent: Mar. 22, 2005

(54) METHODS AND APPARATUS FOR MEASURING FLEXURAL WAVE AND/OR FLEXURAL VIBRATION USING A MAGNETOSTRICTIVE SENSOR

(75) Inventors: Yoon Young Kim, Seoul (KR); Seung Hyun Cho, Yeosu (KR); Young Kyu Kim, Seoul (KR); Woo Chul Kim, Suwon (KR)

(73) Assignee: Seoul National University Industry Foundation (KR)

( * ) Notice: Subject to any disclaimer, the term of this patent is extended or adjusted under 35 U.S.C. 154(b) by 0 days.

(21) Appl. No.: 10/449,043

(22) Filed: May 29, 2003

(65) Prior Publication Data

US 2004/0089072 A1 May 13, 2004

(30) Foreign Application Priority Data

Nov. 8, 2002 (KR) ................................ 10-2002-0069363

(51) Int. Cl.[7] .............................................. G01N 29/24
(52) U.S. Cl. .......................................... 73/643; 73/622
(58) Field of Search .................... 73/622, 643; 324/239, 324/240

(56) References Cited

U.S. PATENT DOCUMENTS

| | | | |
|---|---|---|---|
| 4,314,202 A | | 2/1982 | Okubo |
| 5,456,113 A | * | 10/1995 | Kwun et al. ................... 73/622 |
| 5,581,037 A | * | 12/1996 | Kwun et al. ................... 73/622 |
| 6,109,108 A | * | 8/2000 | Ohtani et al. ................. 73/643 |

FOREIGN PATENT DOCUMENTS

JP 10-239176 9/1998

OTHER PUBLICATIONS

Hegeon Kwun, et al.; Magnetostrictive generation and detection of longitudinal, torsional, and flexural waves in a steel rod; Journal of Acoustical Society of America, vol. 96 (2), pp. 1202–1204, Aug. 1, 1994.

Marcelo J. Dapino, et al.; Structural magnetic strain model for magnetostrictive transducers, IEEE Transaction on Magnetics, vol. 36, No. 3, pp. 545–556, May 2000.

* cited by examiner

Primary Examiner—John E. Chapman
(74) Attorney, Agent, or Firm—Keusey, Tutunjian & Bitetto, P.C.

(57) ABSTRACT

Disclosed is an apparatus or a method for measuring flexural waves and/or vibrations acting on ferromagnetic materials or ferromagnetic films. The present invention includes a bias magnet disposed around the ferromagnetic material so as to form a magnetic field in accordance with a stress distribution pattern occurring as the flexural wave propagates along the above said ferromagnetic material, and a measuring device for measuring the time-varying change of the magnetic induction resulting from the propagation of flexural waves on the ferromagnetic material. In addition to the above components, the bias yoke can be disposed around the ferromagnetic material to support the function of the magnet and the formation of the magnetic circuit as a measuring device for the change of the magnetic induction. In addition, a fixed electromagnet can be used as the bias magnet.

16 Claims, 10 Drawing Sheets

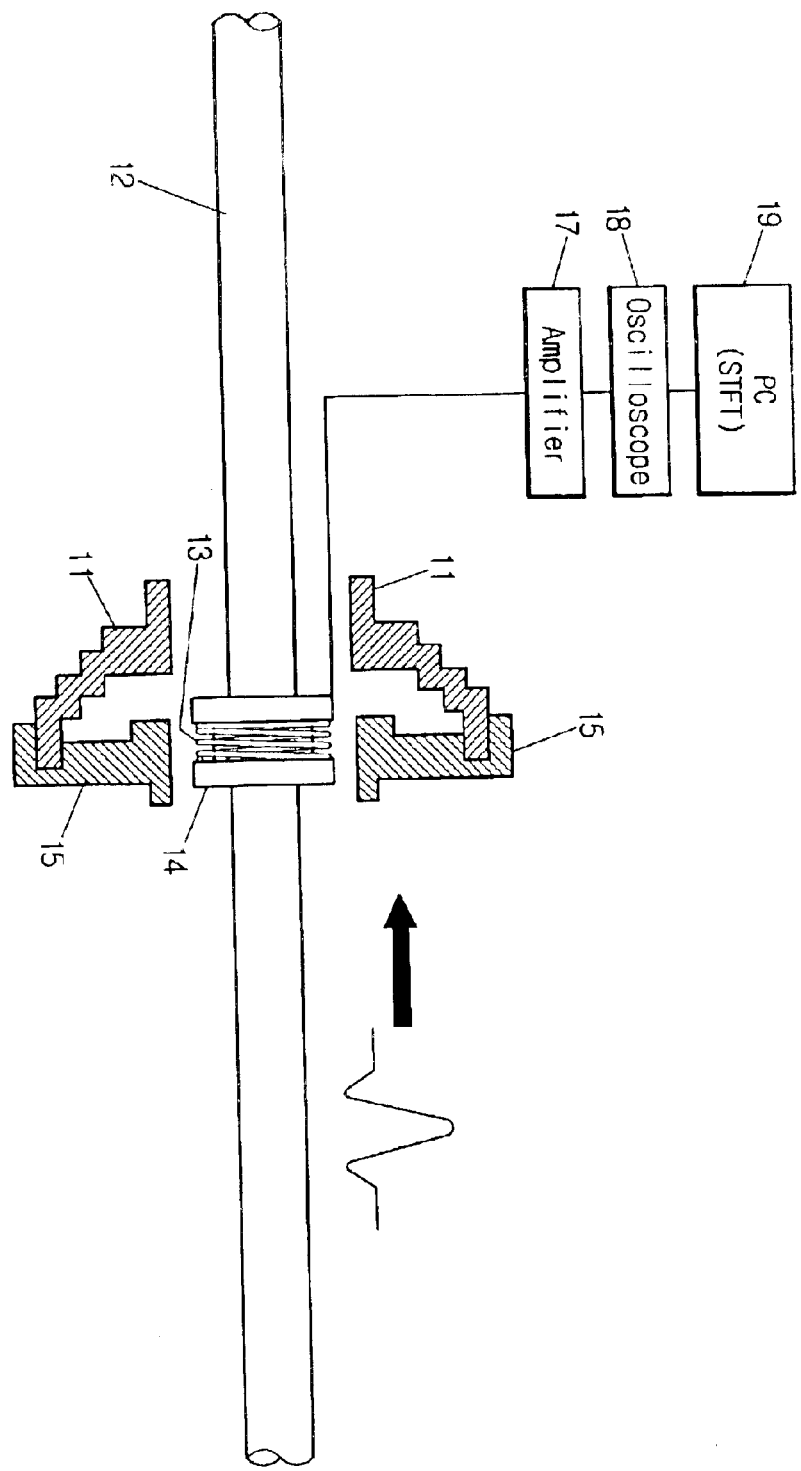

METHODS AND APPARATUS FOR MEASURING FLEXURAL WAVE AND/OR FLEXURAL VIBRATION USING A MAGNETOSTRICTIVE SENSOR

BACKGROUND OF THE INVENTION

1. Field of the Invention

The present invention is related to an apparatus for measuring flexural waves and/or flexural vibrations using a magnetostrictive sensor and the method thereof, which, in particular, disposes the bias magnet configuration to form the magnetic field around ferromagnetic materials and measures flexural waves and/or flexural vibrations from the time-varying change of the magnetic field in ferromagnetic materials resulting from the Inverse Magnetostrictive Effect.

2. Background of the Related Art

When a ferromagnetic material is subjected to a mechanical force, the internal magnetic status of the material changes, which is called the Inverse Magnesotrictive Effect or the Villari Effect. This is the inverse phenomenon of the Joule Effect, where a ferromagnetic object in a magnetic field, undergoes its dimensional change according to the direction of the magnetic field.

The magnetostrictive sensor (Mss) is ordinarily used as a measuring means of elastic waves based on the Inverse Magnetostrictive Effect. The magnetostrictive sensor (Mss), operating in accordance with the Inverse Magnetostrictive Effect or Villari Effect, has a unique possibility of applications, for it can measure the occurring stress change without any mechanical contact with the objects to be measured, especially for the non-destructive examination, impact test for automobiles, noise pattern measuring, instant modal test, etc.

FIG. 1 is a drawing that illustrates the prior art of the measuring apparatus or method of flexural waves using the magnetostrictive sensor. A beam or other mechanical element 2 is disposed within an insulator 4, and a pick-up coil 3 is placed thereon. A magnet 1 is placed in proximity to one side of the insulator 4 and the pick-up coil 3. Coil 3 connects to an amplifier 7, which amplifies the signal through the coil for an oscilloscope 8. Finally, the signal is sent to a personal computer 9 for signal analysis.

Previously, longitudinal waves and torsional waves could be measured with a magnetostrictive sensor. Thereafter, the method to measure the flexural wave by changing the disposition of the bias magnet has been suggested. But in this case the sensor output was too small to conduct the accurate measurement.

The present invention was devised to solve the above said problems of the prior art, and has the purpose of producing an appropriate apparatus or method to measure the flexural wave using a magnetostrictive sensor, wherein high-sensitive output is obtained, accurate measurement is possible, the manufacture of sensor is simple, and the adjustment of the sensor efficiency is easy.

SUMMARY OF THE INVENTION

The purpose of the present invention, as mentioned above, is achieved by providing an apparatus for measuring flexural waves using a magnetostrictive sensor, which includes bias magnets disposed around the ferromagnetic material so as to form a magnetic field in accordance with the distribution pattern of stress occurring as the flexural wave acts on the said ferromagnetic material, and measuring means for the change of the magnetic field resulting from the action of flexural wave on the said ferromagnetic material.

Here, it is preferred that the bias yoke be disposed around the above said ferromagnetic material to support the function of magnets and to form the magnetic circuit as a measuring means of the time-varying change of the magnetic field resulting from the flexural wave propagation.

It is preferred that the bias magnet and the bias yoke have optimized shapes to maximize the output signal of the magnetostrictive sensor.

It is preferred that the bias magnet is a fixed electromagnet, and the bias yoke has an optimized shape for maximizing the output signal of the magnetostrictive sensor.

It is preferred that the core of the electromagnet, being used as a bias magnet, is placed parallel to the ferromagnetic material and the bias yoke has the symmetrical shape with respect to the electromagnet.

In addition, one purpose of the present invention is achieved by providing the method to measure the flexural wave using magnetostrictive sensor, where the bias magnets are disposed around the ferromagnetic material, where the magnetic field is formed to have the same distribution as the cross-sectional profile of the flexural stress wave acting on the ferromagnetic material, wherein the time-varying change of magnetic induction by the flexural wave is measured.

It is preferable to form a magnetic circuit with the bias magnet and the measuring means for the magnetic induction change.

It is preferable to optimize the topology of the bias magnet and bias yoke to maximize the output signal of the magnetostrictive sensor.

It is preferable to optimize the topology of the bias yoke only, when the fixed electromagnet is used as a bias magnet, to maximize the output signal of the magnetostrictive sensor.

The present invention provides an apparatus or a method for measuring flexural waves and/or vibrations using a magnetostrictive sensor, wherein large sensor outputs can be obtained, accurate measurement is possible, the fabrication of the sensor is simple, and the adjustment of sensor efficiency is easy.

BRIEF DESCRIPTION OF THE DRAWINGS

The advantages, nature and various additional features on the invention will appear more fully upon consideration of the illustrative embodiments now to be described in detail in connection with accompanying drawings wherein:

FIG. 3c shows the schematic view of the first embodiment illustrating the apparatus for measuring flexural waves and vibrations using the magnetostrictive sensor and the method thereof.

DETAILED DESCRIPTION OF PREFERRED EMBODIMENTS

Figure 1:
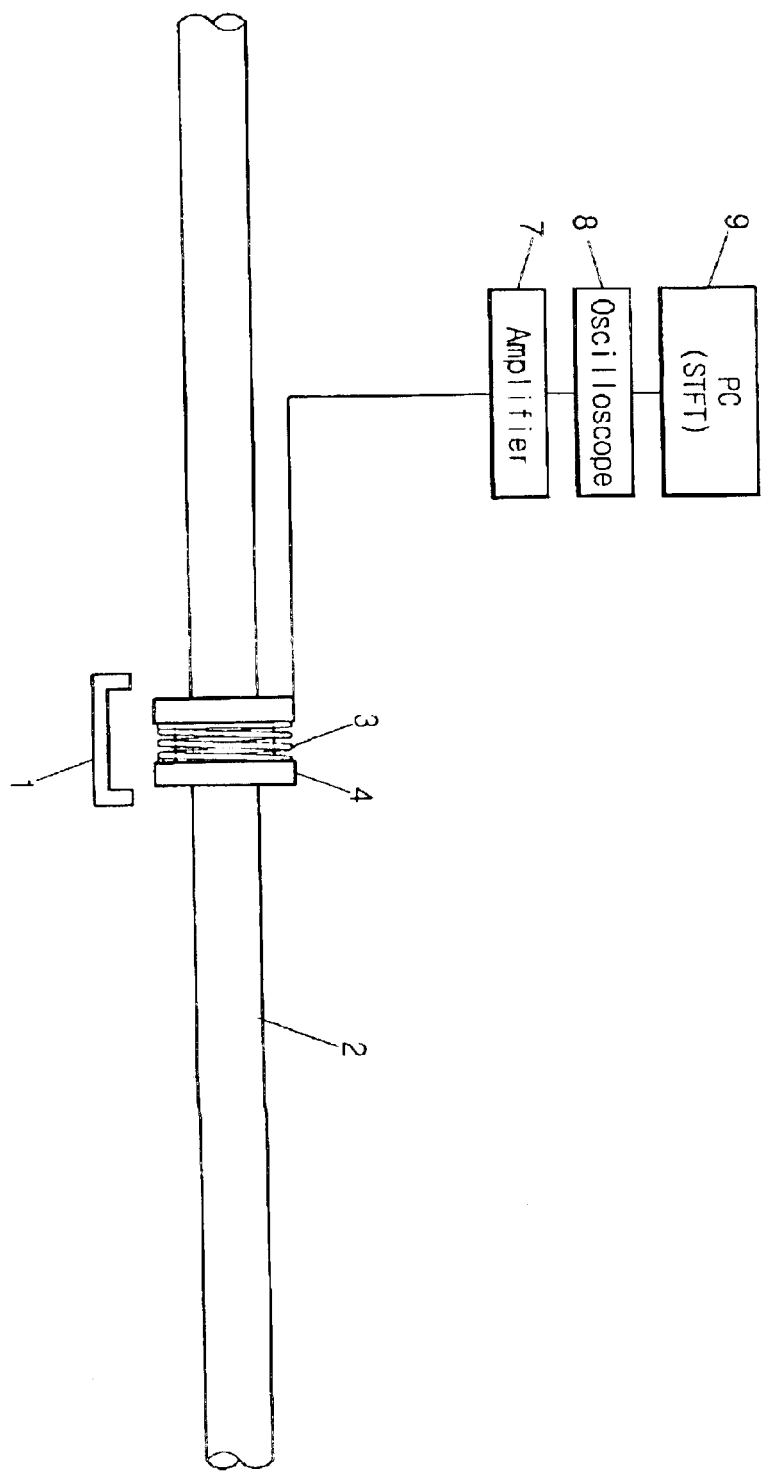
FIG. 1 is a schematic view showing a prior art apparatus or method for measuring flexural waves and/or flexural vibrations using a magnetostrictive sensor.

Hereafter, the preferred embodiments of the present invention will be illustrated in detail referring to the drawings attached.

A first embodiment of the present invention illustrates an apparatus and the method of maximizing the output signal of the sensor by optimizing the bias magnets of the magnetostrictive sensor when the flexural wave propagates. In the first embodiment of the present invention, the density method and OC (Optimality Criterion) have been adopted as an optimization strategy.

In the first place, the magnetostrictive effect is modeled and expressed as the following equation 1.

$$B = q\sigma + \mu H \quad \text{[equation 1]}$$

where $\mu$ represents the permeability, q, the magneto-elastic coupling coefficient, B, the magnetic induction, and H, the magnetic field strength applied by the bias magnet.

The time-variation of the magnetic induction can be measured by Faraday-Lentz's law. The second term of equation 1 can be ignored in evaluating the voltage output of the pick-up coil. Therefore, the output voltage v of the pick-up coil can be written as the following $$v = -N \int_A \frac{dB}{dt} dA = CN \int_A \frac{d\sigma}{dt} dA \quad \text{[equation 2]}$$

where C denotes some constant, N, the number of turns of the pick-up coil, and A, the area of the pick-up coil cross-section.

It is clear from equation 2 that, to measure different kinds of elastic waves, different bias magnetic field distributions should be provided. For instance, the magnetic field distribution should be uniform throughout the cross section of the waveguide, if the elastic wave with a uniform stress distribution (i.e., the lowest branch of the longitudinal wave in the waveguide) is to be measured. In case of the flexural wave propagation, the resulting stress distribution across the cross section may be assumed linear if we are mainly interested in the first branch of the flexural wave.

To maximize the sensor voltage output for flexural waves, the optimal shape of the bias magnet and the yoke that produces a linear magnetic flux density component along the perpendicular direction to the waveguide should be found.

The designing process of the optimal shape of the bias magnet of the first embodiment to maximize the sensor voltage output is illustrated below.

Figure 2:
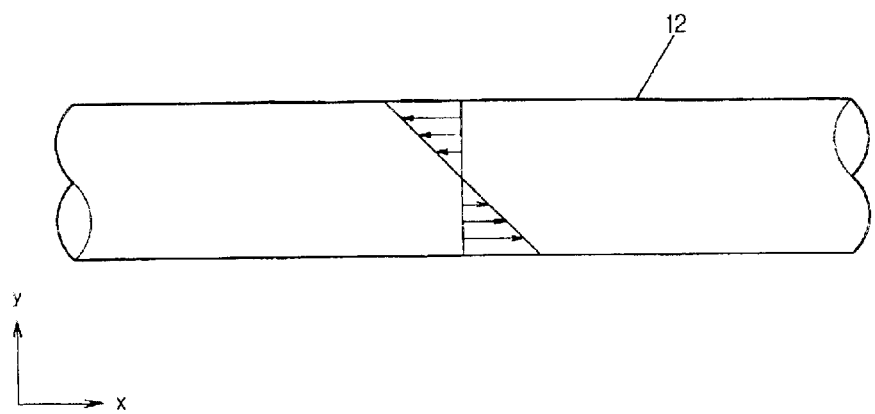
FIG. 2 is a schematic view illustrating the stress profile of a beam when a lowest order flexural wave mode propagates along it.

FIG. 2 is a schematic view illustrating the stress profile of a beam when a lowest-branch flexural wave propagates along it.

In the first place, the objective function defined as the following equation 3 is used to maximize the sensor output voltage.

$$\text{Maximize: } v = \sum_i B_{xi}\sigma_{xi} \quad \text{[equation 3]}$$

where i denotes the sensor measurement location along the vertical direction on the ferromagnetic beam 12, $B_x$ does the component of the magnetic flux density vector in the x axis, and $\sigma_x$ does the linearly distributed stress along the cross section of the ferromagnetic beam 12 (i.e., y direction).

The volume constraint for the optimization problem is defined as the following equation 4.

$$\text{Subject to: } \Sigma v_e - V \leq 0 \quad \text{[equation 4]}$$

where $v_e$ denotes an element volume of a finite element and V, the prescribed volume.

Figure 3A:
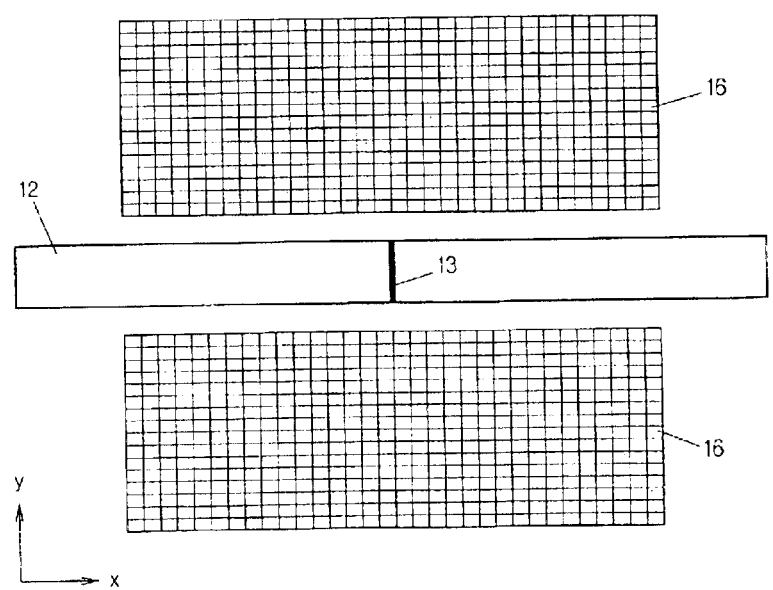
FIG. 3a shows the design domain of a first embodiment.

To find the topology of the bias magnets and yokes that maximize the sensor voltage output in design domain 16, which is divided into two parts as marked in FIG. 3a, the two-dimensional finite element formulation for the magnetostatic field analysis is used, which is stated by the following equations 5 to 8.

$$KA = F \quad \text{[equation 5]}$$

$$K = \frac{1}{\mu} \int\int \left( \frac{\partial N^T}{\partial x} \frac{\partial N}{\partial X} + \frac{\partial N^T}{\partial y} \frac{\partial N}{\partial y} \right) dxdy \quad \text{[equation 6]}$$

$$F = \int\int \left( H_{ex} \frac{\partial N^T}{\partial y} - H_{ey} \frac{\partial N^T}{\partial x} \right) dxdy \quad \text{[equation 7]}$$

$$B_x = \frac{\partial N^T}{\partial y} A \quad \text{[equation 8]}$$

where A denotes the magnetic vector potential, $H_c$, the coercive force, and N, the shape function used in the finite element method.

In the density method, the permeability $\mu$ and the coercive magnetic force $H_c$ of the design domain are regarded as functions of the design variables $\rho$, the densities of finite elements, and the modeled equations are shown in the following equations 9 and 10.

$$\mu = \mu_0\{1 + (\mu_3 - 1)\rho_e^n\} \quad \text{[equation 9]}$$

$$H_c = H_{cm}\rho_e^n \quad \text{[equation 10]}$$

where the subscript e is the index representing the finite element location.

In the above equations, $\mu_0$ and $\mu_m$ denote the permeability of the free space and the relative permeability of the permanent magnet, respectively. The symbol $H_{cm}$ denotes the coercive magnetic force of the permanent magnet and n, the penalty exponent. The design variable $\rho_e$ can vary from 0 to 1. If $\rho_e$ is 0 (actually very close to 0), then the element is interpreted as an air element. On the contrary, if $\rho_e$ approaches 1, it represents the permanent magnet. In case $\rho_e$ is near 0.5, it represents the yoke.

The sensitivity of the objective function of equation 3 can be derived as the following equation 11.

$$\frac{\partial v}{\partial \rho_c} = \sum_i \frac{\partial N^T}{\partial y}\left[K^{-1}\left(\frac{\partial F}{\partial \rho_e} - A\frac{\partial K}{\partial \rho_e}\right)\right]_i \sigma_{xi} \quad \text{[equation 11]}$$

Figure 3B:
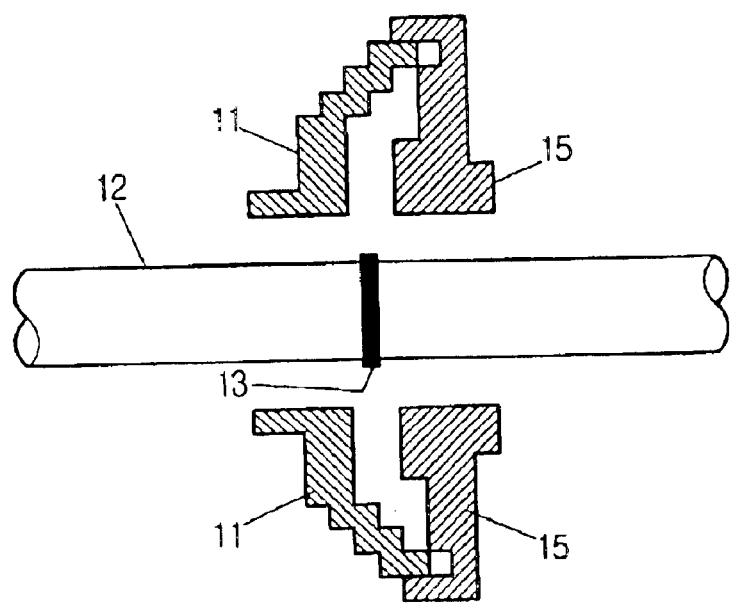
FIG. 3b shows the optimized shape of the bias magnet and yoke of the first embodiment.

In the design domain 16, as marked in FIG. 3a, the optimality criterion (OC) method is employed as an optimizer, and the adjoint variable method is used for sensitivity analysis. The topology of the bias magnets and yokes is designed by the multi-resolution strategy, the method to increase gradually the number of design variables. The bias magnet 11 and the yoke 15, designed as such, are illustrated in FIG. 3b. The bias yoke 15 supports the formation of a magnetic field or magnetic circuit.

In FIG. 3b, the optimized shape of the permanent magnet 11 and the yoke 15 are shown along with a target beam 12.

Several pieces of the block magnets can be used to form the permanent magnet shown in FIG. 3b.

In FIG. 3c, the apparatus for measuring the flexural wave propagating along the beam 12 with the help of the permanent magnet 11 and the yoke 15 is represented.

As illustrated in FIG. 3c, the designed permanent magnet 11 and the designed yoke 15 are disposed at both sides of beam 12 to form a magnetic field that is similar to the stress distribution profile of the ferromagnetic beam 12. The pick-up coil 13 wound on an insulator 14 is installed as illustrated in FIG. 3c. The process of measuring flexural waves and/or vibrations is as follows: the time-varying change of the magnetic induction resulting from the stress wave in beam 12 is measured by the pick-up coil 13; the measured signal is amplified by an amplifier 17; the signal is stored and displayed in an oscilloscope 18; and finally the signal is sent to a personal computer 19 for signal analysis such as STFT (Short Time Fourier Transform) or WT (Wavelet Transform) analyses.

According to the first embodiment of the present invention, it is possible to measure flexural waves and vibrations very efficiently by the optimized topology of bias magnets and yokes.

Hereafter, the second embodiment of the present invention, the apparatus for measuring the flexural waves and/or flexural vibrations using the magnetostrictive sensor and the method are represented.

The second embodiment of the present invention uses an electromagnet of a fixed size as a bias magnet to facilitate the manufacturing of the magnetostrictive sensor, and maximizes the output signal of the sensor by optimizing the topology and the shape of bias yoke of the magnetostrictive sensor. In the second embodiment, the density method and OC (Optimality Criterion) have been applied as optimization techniques, as in the case of first embodiment. Unlike the first embodiment, however, the nonlinearly varying magnetic permeability is also considered in the second embodiment.

In maximizing the voltage output of sensor for the second embodiment, the volume constraint condition is expressed as equations 3 and 4 used for the first embodiment.

However, in the second embodiment; only the bias yoke is optimized, where the magnetic permeability of the yoke is modeled as equation 12.

$$\mu = \mu_0\{1+(\mu_3-1)\rho^n\} \quad \text{[equation 12]}$$

where $\mu_3$ denotes the permeability of the bias yoke.

In case where the bias yoke is assumed to behave linearly, the following equation 13 is employed $$K^{linear} = J^{linear} \quad \text{[equation 13]}$$

where $K^{linear}$ in equation 13 is expressed as the equation 6, and $J^{linear}$ in equation 13 is expressed as the following equation 14.

$$J^{linear} = J_0 \int \int N dx dy \quad \text{[equation 14]}$$

where $J_0$ denotes the current density in the coil of the electromagnet.

When the applied current to the electromagnet is large, nonlinear magnetic analysis becomes necessary. In this case, the magnetic potential A may be obtained by an iteration method such as the Newton-Raphson method, and the (k+1)th approximate value $A_i^{(k+1)}$ for location i is given by the following equations.

$$A_i^{(k-1)} = A_i^{(k)} + \delta A_i^{(k)} \quad \text{[equation 15]}$$

The (k)th $\delta A_i^{(k)}$ is obtained by the following equation 16, and the updating $A_i$ by equation 15 is repeated until $A_i$ converges.

$$K^{Nonlinear} \delta A = J^{Nonlinear} \quad \text{[equation 16]}$$

where $K^{Nonlinear}$ and $J^{Nonlinear}$ are related to the nonlinear property.

The sensitivity analysis for this case can be obtained by an equation similar to equation 11.

In the second embodiment, the design variables $\rho$ can vary from 0 to 1. If $\rho$ is 0 (actually very close to 0), then the element is interpreted as an air element. On the contrary, if $\rho$ approaches 1, it represents the bias yoke.

Figure 4A:
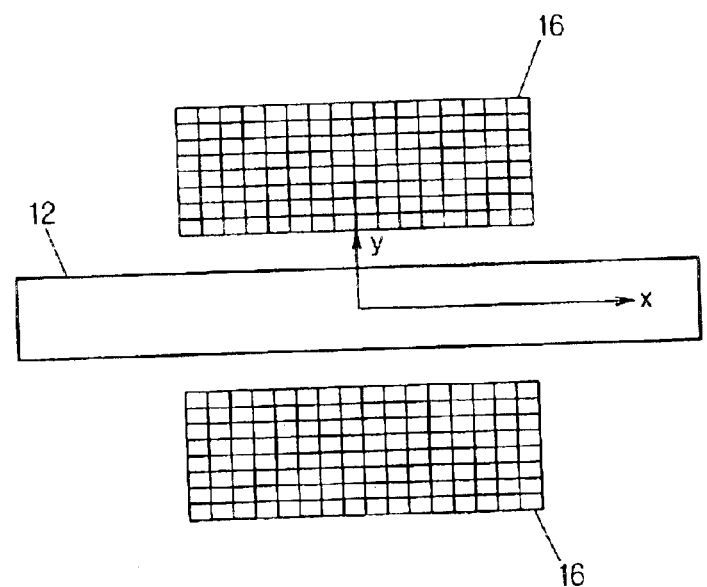
FIG. 4a shows the design domain of a second embodiment.
Figure 4B:
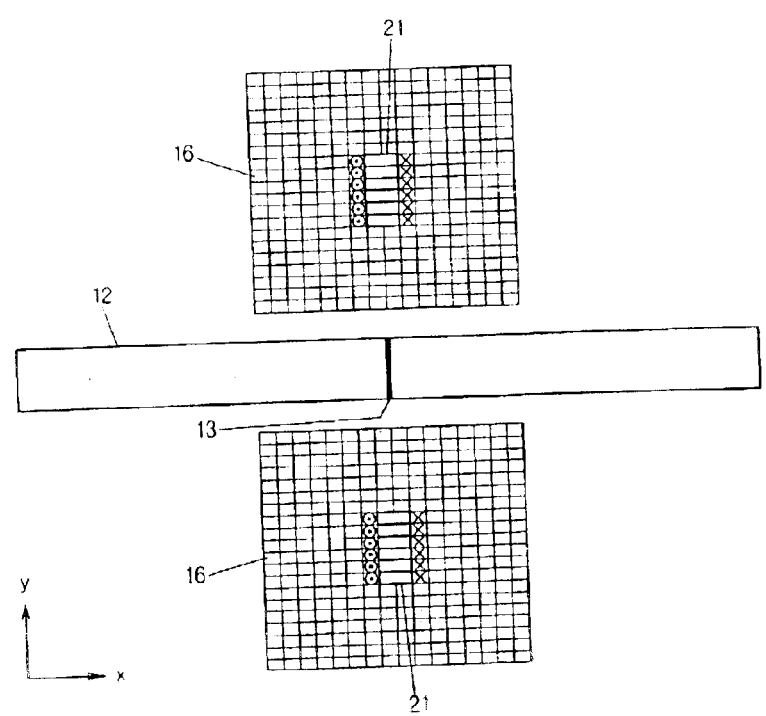
FIG. 4b shows the design domain of the second embodiment and the position of the electromagnets placed vertically to the ferromagnetic beam.
Figure 4C:
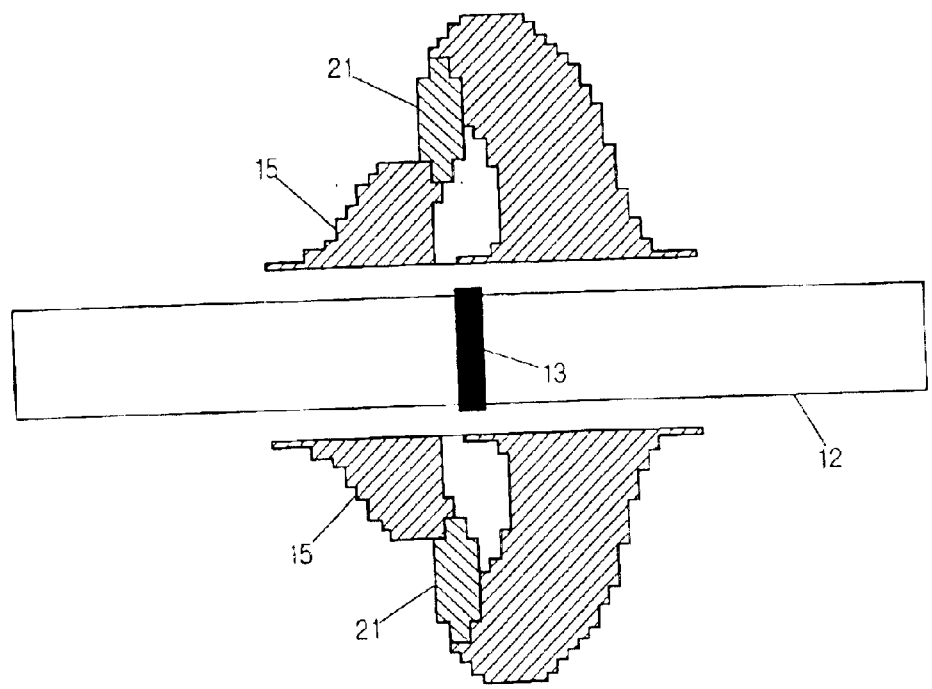
FIG. 4c shows the optimized shape of yokes of the second embodiment when using the electromagnets placed vertically to the ferromagnetic beam.
Figure 4D:
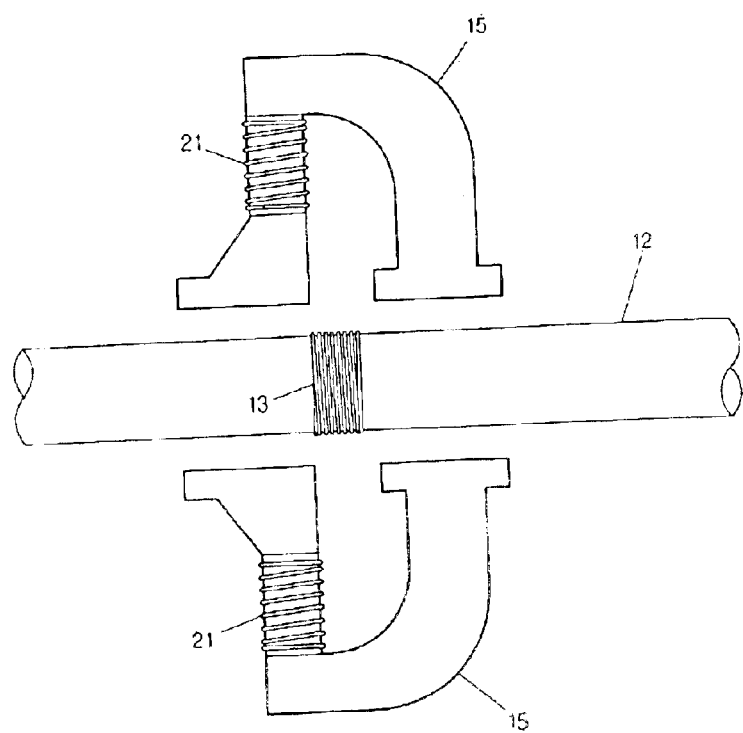
FIG. 4d is a view of the optimized shape of the yokes of FIG. 4c, the contours of which are smoothly connected so as to present a suitable model for manufacturing.

In the design domain 16 as marked in FIG. 4a, the optimized shape of the yoke 15 can be obtained, as illustrated in FIG. 4c, by disposing the magnetic core of the electromagnet 21 perpendicular to the beam 12, assuming that permeability is linear. In FIG. 4b, ⊙ is the direction where the current flows out, and ⊗ is the direction where current flows in.

Figure 5A:
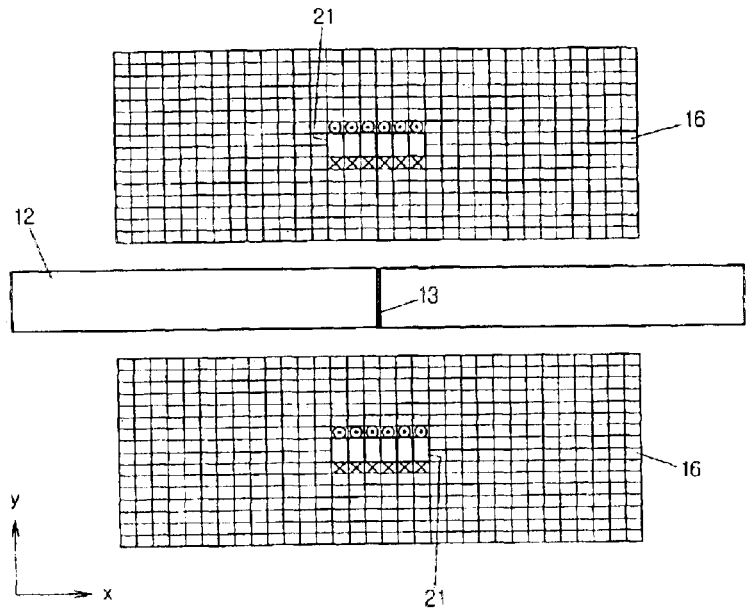
FIG. 5a is a schematic view of the design domain of the second embodiment and the position of electromagnets placed parallel to the ferromagnetic beam to be measured.
Figure 5B:
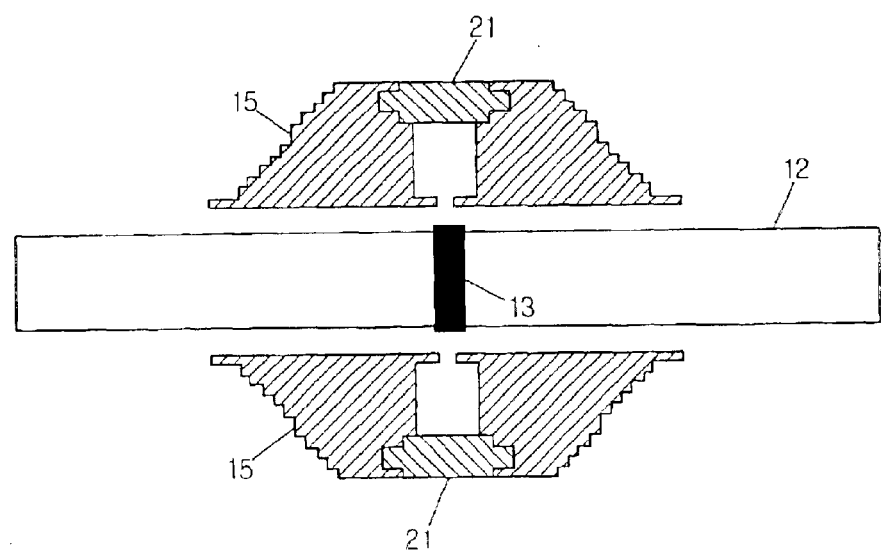
FIG. 5b is a schematic view of the optimized shape of the yokes of the second embodiment, in case electromagnets are placed parallel to the ferromagnetic beam and the magnetic permeability is assumed to behave linearly.

In addition, the optimized shape of the bias yoke 15 can be obtained, as illustrated in FIG. 5b, by disposing the magnetic core of the electromagnet 21 parallel to the beam 12 as illustrated in FIG. 5a, assuming the permeability is linear. In FIG. 5a, ⊙ is the direction where current flows out, and ⊗ is the direction where current flows in.

Figure 5C:
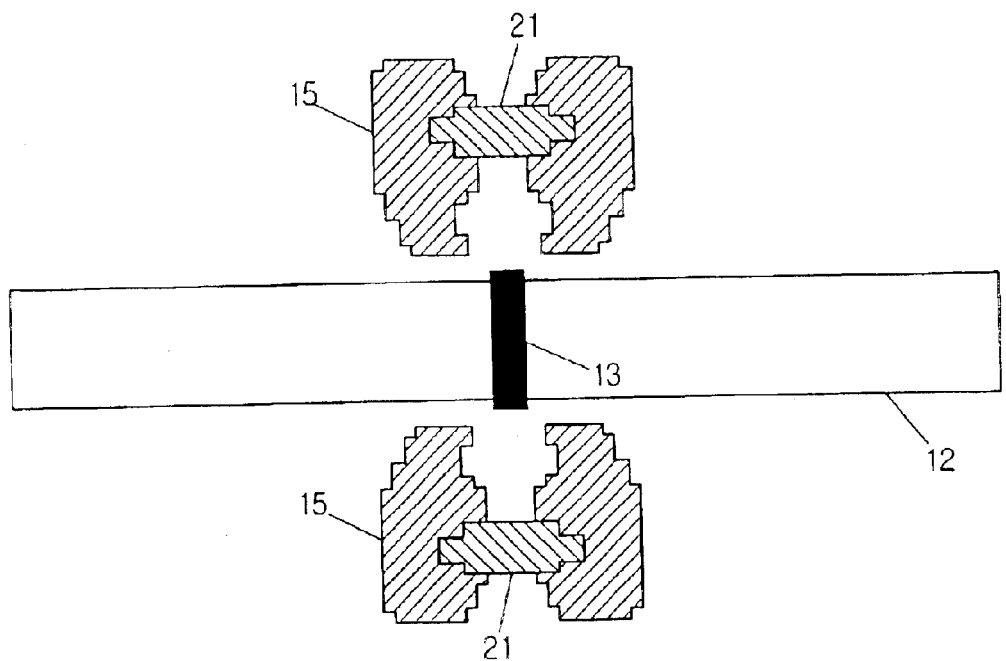
FIG. 5c is a schematic view of the optimized shape of the yokes of the second embodiment, in case electromagnets are placed parallel to the ferromagnetic beam and magnetic permeability is assumed to behave nonlinearly.

In addition, the optimized shape of the bias yoke 15 can be obtained, as illustrated in FIG. 5c, by disposing the magnetic core of the electromagnet 21 parallel to the beam 12 as illustrated in FIG. 5a, assuming the permeability is non-linear.

Figure 5D:
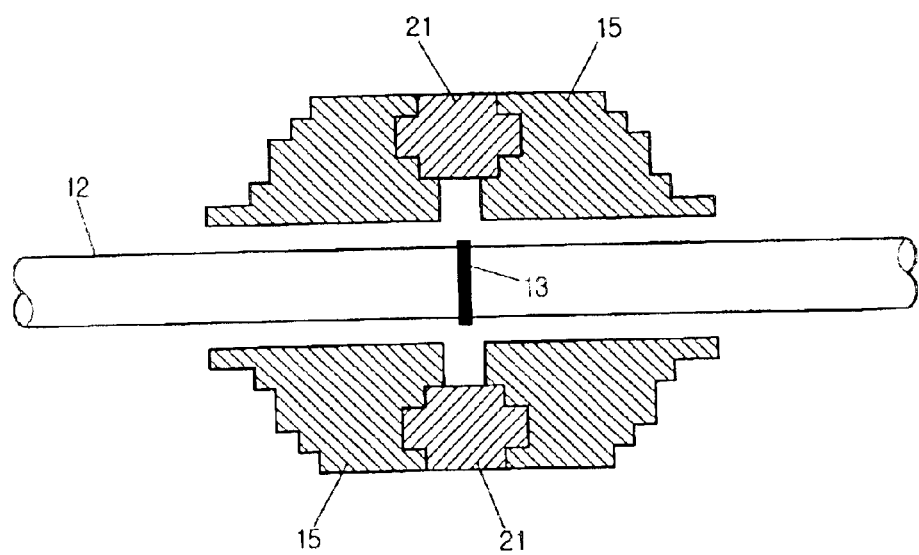
FIG. 5d is a schematic view of the optimized shape of the yoke of the second embodiment, in case the electromagnet placed parallel to the beam is placed more closely to the beam and magnetic permeability is assumed to behave linearly.
Figure 5E:
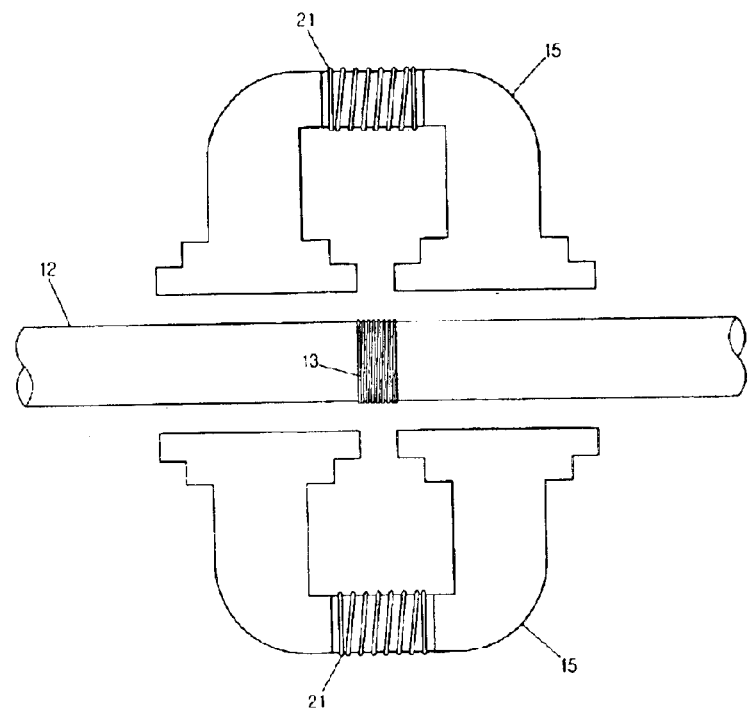
FIG. 5e is a view of the optimized shape of the yokes of FIG. 5c, the contours of which are smoothly connected so as to present a suitable model for manufacturing.

If the electromagnet 21 is located more closely to beam 21, a bias yoke having a similar shape as before can be obtained, as illustrated in FIG. 5d. The optimized shape of the bias yoke 15 has many rectangular angles, as shown in FIG. 4c, FIG. 5b, FIG. 5c, for the design domain, which are assumed to consist of small rectangles for numerical optimization. However, the contour of the optimized bias yoke 15 can be smoothly connected so as to present a practical model for manufacturing.

Figure 5F:
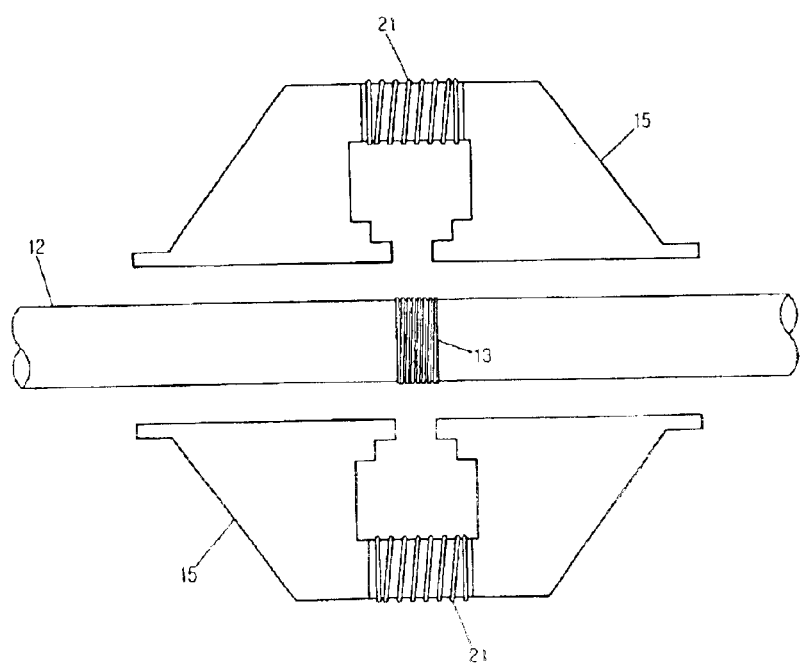
FIG. 5f is a view of the optimized shape of the yokes of FIG. 5d, the contours of which are smoothly connected so as to present a suitable model for manufacturing.
Figure 5G:
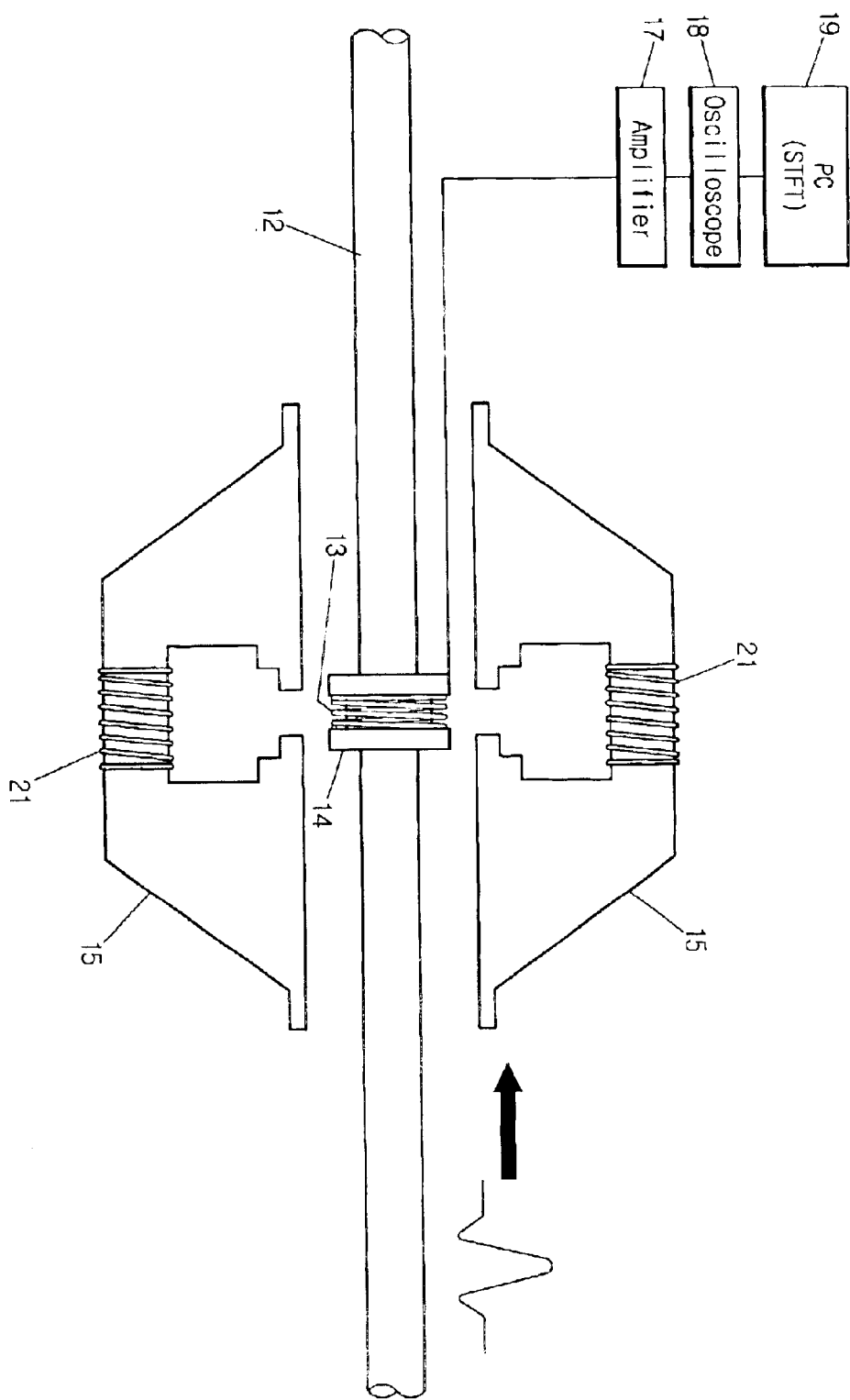
FIG. 5g is a schematic view of the second embodiment, showing the apparatus and the method for measuring flexural waves and/or flexural vibrations using the magnetostrictive sensor.

FIG. 5g shows the apparatus for measuring flexural waves propagating along the ferromagnetic beam 12 by the electromagnet 21 and the optimized bias yoke 15, where the contour of the bias yoke 15 is adjusted so as to be suitable for manufacturing.

As illustrated in FIG. 5g, the beam 12 is encircled by an insulator 14 and the pick-up coil 13 which will convert the magnetic induction change inside the beam 12 into the voltage change. The process of measuring flexural waves and/or flexural vibrations is as follows: the change of the magnetic induction is measured by the pick-up coil 13; the measured signal is amplified by the amplifier 17; the signal is digitized and stored in the oscilloscope 18; and finally the signal is sent to the personal computer 19 to conduct signal processing. In FIG. 5g, the magnetostrictive sensor employing the electromagnet 21 and the bias yoke 15 of FIG. 5f is illustrated, but the electromagnet 21 and the bias yoke 15, as depicted in FIG. 5b to FIG. 5e, can be used as well.

According to the second embodiment of the present invention, the problem of the prior art, using the magnet with a complex shape, can be solved by employing the fixed electromagnet 21 and the optimized yoke 15. In addition, by employing an electromagnet as the bias magnet of the magnetostrictive sensor, the adjustment of sensor efficiency can easily be performed.

An apparatus and method of measuring flexural waves and/or vibrations have been introduced. The present invention can be employed with non-ferromagnetic material, as well, by coating the surface of the object to be measured with thin films made of ferromagnetic material such as, for example, Terfenol-D or equivalents.

EFFECTS OF THE INVENTION

According to the present invention, the accurate measurement of flexural waves and/or vibrations is possible by optimizing the shape of the bias magnets and/or the bias yokes so as to yield the maximized voltage output of the magnetostrictive sensor.

In addition, the present invention has an advantage of solving the problem of the prior art, i.e. using the magnet with a complex shape, by employing the fixed electromagnet 21 and the optimized yoke 15. The present invention also has the advantage of easy adjustment of sensor efficiency by employing an electromagnet as the bias magnet of the magnetostrictive sensor.

The present invention can be employed with non-ferromagnetic material, by coating the surface of the object to be measured with ferromagnetic thin films.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed:

1. An apparatus for measuring flexural waves and/or vibrations using a magnetostrictive sensor, comprising:
    a bias magnet disposed around an object including ferromagnetic material;
    measuring means for measuring a change in magnetic field resulting from the action of flexural waves and/or vibrations on the object including ferromagnetic material; and
    a bias yoke disposed around the object including ferromagnetic material, to support the formation of a magnetic circuit in the bias magnet and the measuring means,
    wherein the bias magnet and the bias yoke form a magnetic field distribution in accordance with a stress distribution pattern occurring as flexural waves and/or vibrations occurring in the object to maximize the output of the magnetostrictive sensor.

2. The apparatus of claim 1, wherein the bias magnet is a fixed electromagnet.

3. The apparatus of claim 2, wherein the electromagnet, used as a bias magnet, has an iron core disposed longitudinally parallel to the object including ferromagnetic material, and the bias yoke has a shape symmetric with respect to the electromagnet to maximize the output of the magnetostrictive sensor.

4. The apparatus of claim 1, wherein the object including ferromagnetic material includes an object having a ferromagnetic coating thereon.

5. A method of measuring flexural waves and/or vibrations using a magnetostrictive sensor, comprising:
    disposing a bias magnet and a bias yoke around a body including ferromagnetic material, wherein the bias magnet and the bias yoke form a magnetic field distribution in accordance with a stress distribution pattern occurring as flexural waves and/or vibrations acting on the body to maximize the output of the magnetostrictive sensor by optimizing the bias magnet and the bias yoke; and
    measuring the change of magnetic induction resulting from the action of flexural waves and/or vibrations on the body including ferromagnetic material.

6. The method of claim 5, wherein forming a magnetic circuit with the bias magnet and a measuring means is further included.

7. The method of claim 6, wherein the bias magnet is a fixed electromagnet.

8. The method of claim 5, wherein the object including ferromagnetic material includes an object having a ferromagnetic coating thereon.

9. An apparatus for measuring flexural waves and/or vibrations using a magnetostrictive sensor, comprising:
    a bias magnet disposed around an object including ferromagnetic material, the bias magnet forming a magnetic field in accordance with a stress distribution pattern occurring as flexural waves and/or vibrations occurring in the object;
    measuring means for measuring a change in magnetic field resulting from the action of flexural waves and/or vibrations on the object including ferromagnetic material; and
    a bias yoke disposed around the object including ferromagnetic material, to support the formation of a magnetic circuit in the bias magnet and the measuring means,
    wherein at least one of the bias magnet and the bias yoke have a shape which maximizes the output of the magnetostrictive sensor.

10. The apparatus of claim 9, wherein the bias magnet is a fixed electromagnet.

11. The apparatus of claim 10, wherein the electromagnet, used as a bias magnet, has an iron core disposed longitudinally parallel to the object including ferromagnetic material, and the bias yoke has a shape symmetric with respect to the electromagnet to maximize the output of the magnetostrictive sensor.

12. The apparatus of claim 9, wherein the object including ferromagnetic material includes an object having a ferromagnetic coating thereon.

13. A method of measuring flexural waves and/or vibrations using a magnetostrictive sensor, comprising the steps of:
    disposing a bias magnet around a body including ferromagnetic material, so as to form a magnetic field in accordance with a stress distribution pattern occurring as flexural waves and/or vibrations acting on the body; and measuring the change of magnetic induction resulting from the action of flexural waves and/or vibrations on the body including ferromagnetic material, wherein the optimizing the bias magnet and a bias yoke is further included to maximize the output of the magnetostrictive sensor.

14. The method of claim 13, wherein forming a magnetic circuit with the bias magnet and a measuring means is further included.

15. The method of claim 13, wherein the bias magnet is a fixed electromagnet.

16. The method of claim 13, wherein the body including ferromagnetic material includes an object having a ferromagnetic coating thereon.

* * * * *